United States Patent [19]
Maurice et al.

[11] 3,804,393
[45] Apr. 16, 1974

[54] STEEL CONVERSION APPARATUS

[75] Inventors: Harvey W. Maurice, Butler;
Alexander T. Dortenzo, Pittsburgh, both of Pa.

[73] Assignee: Pennsylvania Engineering Corporation, Pittsburgh, Pa.

[22] Filed: Aug. 9, 1971

[21] Appl. No.: 170,147

[52] U.S. Cl. ............................... 266/35, 266/41
[51] Int. Cl. ......................................... C21c 5/48
[58] Field of Search .............. 266/35, 36 P, 43, 41; 75/60

[56] References Cited
UNITED STATES PATENTS

| | | | |
|---|---|---|---|
| 2,977,108 | 3/1961 | Cogelja et al. | 266/35 |
| 51,401 | 12/1865 | Bessemer | 75/43 |
| 94,997 | 9/1869 | Bessemer | 75/43 |
| 358,559 | 3/1887 | Laureau | 266/36 P |
| 741,505 | 10/1903 | Kirk | 266/36 P |
| 2,333,654 | 11/1943 | Lellep | 266/41 |
| 3,093,570 | 6/1963 | Dewey | 266/43 |
| 3,397,878 | 8/1968 | Holmes et al. | 266/41 |
| 3,706,549 | 12/1972 | Knuppel et al. | 266/35 |
| 3,330,645 | 7/1967 | Moustier et al. | 266/35 |

*Primary Examiner*—Gerald A. Dost

[57] ABSTRACT

An open topped vessel for converting molten ferrous metal to steel is pivotable about a horizontal axis and has bottom tuyeres which permit the blowing of oxygen and other gases upwardly through the molten metal. The tuyeres are arranged in an integral refractory plug which may rapidly be mounted in the vessel bottom during vessel relining.

10 Claims, 3 Drawing Figures

PATENTED APR 16 1974  3,804,393

INVENTORS
HARVEY W. MAURICE
ALEXANDER T. DORTENZO
BY
ATTORNEYS

3,804,393

STEEL CONVERSION APPARATUS

BACKGROUND OF THE INVENTION

Objectives of modern steel plant designs are to reduce both operating and capital investment, to reduce pollution that is incidental to the process and to more fully automate the process. As is well known, considerable progress has been made in recent years in reducing cost and pollution by use of the basic oxygen methods of converting steel. As currently practiced, this method involves charging a converter vessel with a mixture of molten pig iron and solid scrap steel and then blowing pure oxygen into the top surface of the melt by means of an oxygen lance that is inserted through the top of the vessel. The exothermic reaction between oxygen and silicon, manganese, phosphorus and carbon in the hot metal produces sufficient heat to melt the scrap metal and produce liquid steel. The temperature of the melt is taken periodically to determine when the reaction is complete and when the melt is ready for discharge from the vessel for use or further treatment. Openings must be left in the gas collecting hood over the vessel to insert the thermocouple and oxygen lances and to introduce fluxing materials and other additives.

The established procedures have disadvantages. For instance, projecting the oxygen lance vertically downwardly into the center of the converter vessel requires that the vessel be in a very high building since the oxygen lance is usually fifty or more feet long and is of even greater size when its suspension mechanism is considered. Measuring the temperature of the melt is also problematical because it is difficult to locate the thermocouple where it will measure a temperature that is truly representative of the melt. The top blown oxygen method is characterized by hot spots developing in the top of the melt where the oxygen impinges because that is the primary reactive region. Moreover, the hot spots on the melt surface radiate to the refractory lining, causing hot spots to develop on it. Thus, the refractory is not a good place for locating a thermocouple if a temperature that is representative of the melt or proportional to it is to be attained. The inability to sense melt temperature precisely, instantaneously and continuously is one of the factors that has retarded automating the steel making process. Another disadvantage of present day top blown oxygen converters is that they slop over and eject slag and metal from the melt.

The present trend is to supplant existing open hearth steel making plants with the top blown oxygen converters and to install the latter in the new plants. In addition to the oxygen steel making process being more economical, it also produces less atmospheric pollutants than the open hearth process. Equipping open hearth plants with modern pollution abatement apparatus is difficult and extremely costly but it is being done because in many cases substituting a conventional oxygen converter is even more costly since this requires drastic equipment rearrangements and modification of existing buildings. One of the reasons for conventional oxygen converter vessels not fitting into existing buildings is that these vessels operate in conjunction with apparatus for blowing oxygen through the top mouth of the vessel. Much overhead space is required to accommodate this equipment and this space is only obtainable in most cases at the expense of modifying the building.

These disadvantages of top blown vessels have to a large extent been overcome by more recently developed bottom blown vessels. Prior art bottom blown converter vessels generally include a large number of individual tuyeres which are distributed over a large portion of the vessels bottom so as to more evenly distribute the gases employed in the process. For example, a 150 ton vessel may have 24 or more tuyeres. In addition, it is common to inject more than one gas through each tuyere. Such gases are generally introduced by separate concentric pipes which extend through each tuyere and may include, for example, oxygen and a hydrocarbon, such as propane, which is employed to prolong the life of the refractory lining. Because of the large number of tuyeres employed, and because of a plurality of gases are often separately piped into each tuyere, a large number of pipes must be arranged below the vessel and conducted up through the respective tuyeres.

The linings of bottom blown converter vessels must be replaced frequently as the result of heat, abrasion and the chemical reactions incident to the process. This also requires a replacement of the tuyere structure and their associated gas inlet pipes. With prior art vessel designs, the replacement of the tuyeres and gas pipe system may take as long as four hours, during which time the vessel would, of course, not be available for service.

SUMMARY OF THE INVENTION

A general object of the invention is to provide a new and improved tuyere system for bottom blown converter vessels.

Another object of the invention is to provide a tuyere system for bottom blown converter vessels which may be installed rapidly.

A further object of the invention is to provide a tuyere system for bottom blown converter vessels which facilitate vessel relining.

Yet another object of the invention is to provide a bottom blown converter vessel with a tuyere system which permits a simplified piping system.

These and other objects and advantages of the present invention will become more apparent from the detailed description thereof taken with the accompanying drawings.

In general terms, the invention comprises an open topped converter vessel having a metallic shell, a refractory lining and an integral refractory plug disposed in the lower end of the vessel and having a plurality of tuyeres formed therein. A pair of manifold systems each provide a pair of separate gas inlets to each tuyere.

DESCRIPTION OF THE PREFERRED EMBODIMENT

Figure 1:
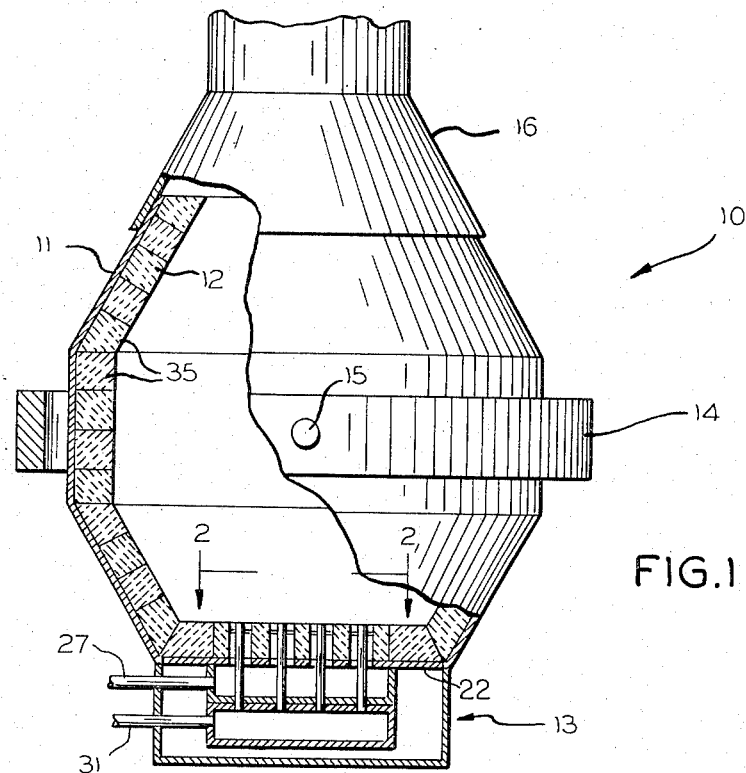
FIG. 1 is a front elevational view, partly in section, of a converter vessel having a tuyere system according to the present invention.

The bottom blown converter vessel 10 is shown in FIG. 1 to be open at its upper end and to include a metallic shell 11 and a refractory lining 12. A tuyeres system 13 is provided at the lower end of the vessel to permit the injection of gases by means which will be described more fully below. As those skilled in the art will appreciate, conversion vessels of this type are generally supported in a conventional manner on a trunnion ring 14 which has a trunnion 15 extending from each of its opposite sides. The trunnions 15 are suitably supported in a well known manner on bearing structures (not shown) and are coupled to a suitable drive mechanism (not shown) for tilting vessel 10 to each of a plurality of positions as may be required during a process cycle. A smoke hood 16 may be disposed above the open upper end of vessel 12 when the latter is in its vertical position shown in FIG. 1 to prevent the discharge of pollutants during operation of the vessel.

Figure 2:
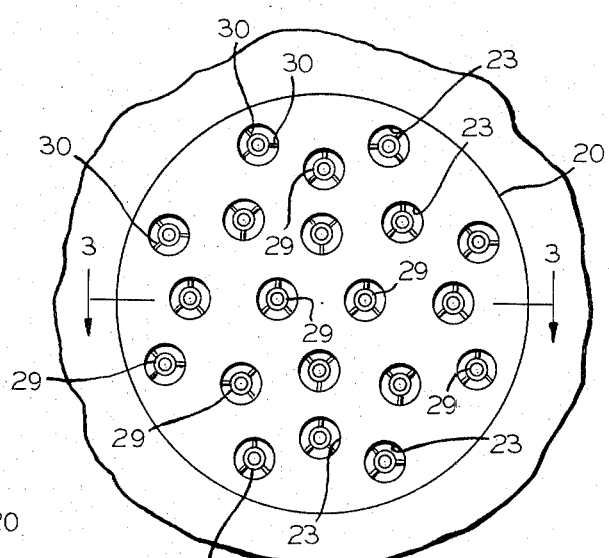
FIG. 2 is a view taken along lines 2—2 of FIG. 1.
Figure 3:
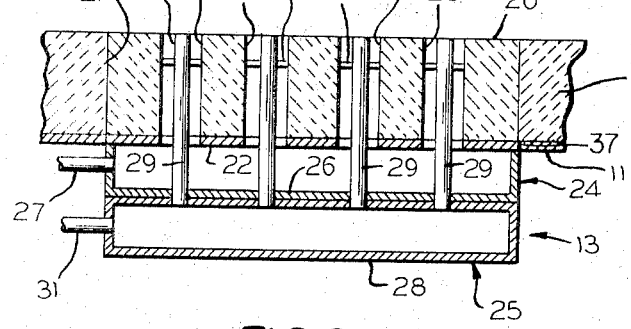
FIG. 3 is a view taken along lines 3—3 of FIG. 2.

The tuyere system 13 is shown more specifically in FIGS. 2 and 3 to include the unitary refractory plug 20 which is received within an opening 21 formed in the lower wall of the refractory lining 12. A metallic backup plate 22 may be suitably secured to the underside of plug 20 and may similarly be received within an opening 37 formed in the metallic outer shell 11. A plurality of spaced apart tuyeres or passages 23 are formed through the plug 20 and plate 22. In addition, first and second gas input units 24 and 25 are suitably secured to plate 22 below plug 20 for conducting different gases in a parallel relation to tuyeres 23. Gas unit 24 consists of a metallic shell 26 which is secured in a sealed relation to the plate 22 and in a surrounding relation to the tuyeres 23. A gas inlet pipe 27 connects the shell 26 to a suitable gas under pressure which then passes upwardly through tuyeres 23. The second gas unit 25 similarly consists of a metallic shell 28 suitably affixed to the underside of shell 26. A plurality of pipes 29 extend upwardly through aligned openings in shell 26 and in a coaxial relation with respect to the tuyeres 23. Suitable spacer members 30 may be disposed between pipes 28 and the walls of passages 23 to retain pipes 28 in a substantially coaxial relation. The shell 28 may similarly be connected to a source of gas under pressure which then passes upwardly through pipes 29 and into the interior of vessel 10.

In operation of the apparatus discussed heretofore, the vessel 10 will normally be pivoted about the axis of trunnion pins 15 and hot metal or scrap will be charged through its open upper end. A first gas, such as oxygen, will be conducted through the inlet pipe 31 to the interior of shell 28, upwardly through each of the pipes 29 and into the vessel 10. The oxygen reacts with the constituents of the hot metal to perform the conversion process in a manner well known in the art.

It is also known that by simultaneously conducting a hydrocarbon gas, such as propane, upwardly through the tuyere system 13, the life of the refractory lining 12 can be prolonged. Toward this end, the hydrocarbon gas under pressure is conducted into shell 26 through pipe 24 and the same then passes upwardly through tuyeres 23 and around pipes 29. For a more complete description of methods which may be performed within the vessel 10, reference is made to co-pending application, Ser. No. 163,591 filed July 19, 1971 and assigned to the assignee of the instant invention.

As a result of chemical reaction, abrasion and heat the lining 12 of the vessel 10 becomes worn and it must be replaced periodically. The lining will normally be fabricated from refractory bricks 35 which are affixed within the shells 10 in a manner well known in the art. However, because of a large number of tuyeres located in the lower portion of bottom blown vessels such as that shown in FIG. 1, it often took as long as four hours to reline this portion of the apparatus. The tuyere structure according to the instant invention may be replaced in as little as one hour because it merely involves placing the preformed tuyere plug member 20 into position and then suitably connecting the gas units 24 and 25. The plug member 20 may be fabricated by casting or ramming refractory materials in a mold or by preassembling refractory members which are suitably shaped. The gas units 24 and 25 may also be assembled to the plug member 20 away from the site or they may be attached thereto after the plug 20 has been affixed to the vessel. This configuration not only allows more rapid relining so as to minimize labor expenses, but in addition, the initial fabrication of the vessel is also less expensive. In addition, a reduction in religning time allows the vessel 10 to be returned to service more rapidly. Further, a substantial saving is also realized because the elaborate piping required in prior art structures is no longer necessary.

While only a single embodiment of the invention has been illustrated and described it is not intended to be limited thereby but only by the scope of the appended claims.

We claim:

1. A vessel for converting molten ferrous metal to steel including, a refractory lining, a charge receiving opening formed in said vessel and lining, a second opening formed in the lower end of said lining, a unitary refractory plug disposed in said second opening, said plug having a plurality of openings, metal tuyere pipe means extending through each opening, respectively, of said plug, said tuyere pipe means defining internal substantially unimpeded first passages for introducing one gas to said vessel, each opening having a transverse cross-sectional area greater than said tuyere pipe means to define second substantially unimpeded passages defined by the outside of said tuyere pipe means and the inside of said openings through said bottom and said second passages being in surrounding relation with respect to said first passages for introducing another gas to said vessel, said tuyere pipe means being mounted with respect to said plug means for insertion into and separation from said openings in said plug means, plate means supporting said plug, said vessel including a shell having an opening in registry with said second opening in said lining and said plate means fitting into said shell opening, and gas distributing means mounted to said plate means adjacent said plug, said gas distribution means including separate gas flow paths isolated from each other, each of said paths communicating gas to different ones of said unimpeded gas passage means.

2. The vessel set forth in claim 1 wherein the interior of said tuyere pipe means constitutes one substantially unimpeded gas passage means and the exterior of said pipe means defines the inside of the other substantially unimpeded passage means for conducting said second gas through said passage means independently of said one gas.

3. The vessel set forth in claim 1 wherein said refractory plug comprises a member cast from a refractory material and having said plurality of openings formed therein.

4. The vessel set forth in claim 1 wherein said refractory plug comprises a rammed refractory material having said plurality of openings formed therein.

5. The vessel set forth in claim 1 wherein said refractory plug comprises a plurality of refractory members joined in a unitary assembly and at least certain of said members being arranged to form said plurality of openings through said plug.

6. The vessel set forth in claim 1 wherein said gas distributing means includes a first chamber means communicating with said tuyere pipe means and a second chamber means adjacent said first chamber means, said second chamber means communicating with the passage defined by the exterior of said tuyere pipe means, each chamber means being connected to a source of a different gas under pressure.

7. The vessel set forth in claim 6 wherein said pipe means extend freely through said plate and terminate substantially at the inner surface of said plug member.

8. The vessel set forth in claim 7 wherein said refractory plug comprises a member cast from a refractory material and having a plurality of passages formed therein.

9. The vessel set forth in claim 1 wherein said refractory plug comprises a rammed refractory material having said plurality of openings formed therein.

10. The vessel set forth in claim 7 wherein said refractory plug comprises a plurality of refractory members joined in a unitary assembly and at least certain of said members arranged to form said plurality of openings through said plug.

* * * * *